United States Patent [19]

Engel-Badar et al.

[11] Patent Number: 5,019,640
[45] Date of Patent: May 28, 1991

[54] PRODUCING A POLYETHYLENE TEREPHTHALATE BASED POLYMER FROM A LOWER DIALKYL ESTER OF A DICARBOXYLIC ACID AND A GLYCOL

[75] Inventors: Monika Engel-Badar, Charlotte, N.C.; Bobby N. Furr, Fort Mill, S.C.

[73] Assignee: Hoechst Celanese Corporation, Somerville, N.J.

[21] Appl. No.: 461,878

[22] Filed: Jan. 8, 1990

Related U.S. Application Data

[63] Continuation-in-part of Ser. No. 425,540, Oct. 23, 1989, abandoned.

[51] Int. Cl.$^5$ .............................................. C08G 63/83
[52] U.S. Cl. ................................... 528/272; 528/274; 528/277; 528/279; 528/280; 528/285; 528/286; 528/296; 528/298; 528/302; 528/308; 528/308.6; 525/437; 525/444; 524/706; 524/779; 524/783; 524/784; 524/785
[58] Field of Search ............... 528/272, 274, 277, 279, 528/280, 285, 286, 296, 298, 302, 308, 308.6; 525/437, 444; 524/706, 779, 783, 784, 785

[56] References Cited

U.S. PATENT DOCUMENTS

| | | | |
|---|---|---|---|
| 3,487,049 | 12/1969 | Busot | 526/65 |
| 3,657,180 | 4/1972 | Cohn | 524/775 |
| 3,709,859 | 1/1973 | Hrach et al. | 528/276 |
| 3,907,754 | 9/1975 | Tershansy et al. | 528/277 |
| 3,951,905 | 4/1976 | Sano et al. | 524/399 |
| 3,962,189 | 6/1976 | Russin et al. | 528/277 |
| 4,010,145 | 3/1977 | Russin et al. | 528/280 |
| 4,107,149 | 8/1978 | Bier et al. | 528/309 |
| 4,501,878 | 2/1985 | Adams | 528/286 |

FOREIGN PATENT DOCUMENTS 1417738 12/1975 United Kingdom .
1522656 8/1978 United Kingdom .

*Primary Examiner*—John Kight, III
*Assistant Examiner*—Sam A. Acquah
*Attorney, Agent, or Firm*—Gregory N. Clements

[57] ABSTRACT

A process for producing PET based polyester polymers from a lower dialkyl ester of a dicarboxylic acid and a glycol selected from the class of ethylene glycol, diethylene glycol, polyethylene glycol, blends of ethylene glycol and propane and/or butane diol, or mixtures of two or more of these, using the novel catalyst system and a small amount of dicarboxylic acid is described. The novel catalyst composition includes from about 10 ppm to about 150 ppm manganese; from about 50 ppm to about 250 ppm lithium; preferably from about 10 ppm to about 40 ppm cobalt; and from about 200 ppm to about 400 ppm antimony, all amounts being based upon the expected yield of the polyester based polymer. The process for using the novel catalyst composition to make polyester includes the step of employing an effective catalytic amount of manganese and lithium in an ester interchange reaction where the lower dialkyl ester and glycol produce monomer; and using an effective catalytic amount of cobalt and antimony in the polycondensation reaction and a small effective amount of dicarboxylic acid to convert the monomer to polyester. Using the novel catalyst composition and effective amount of dicarboxylic acid to produce a polyester based polymer drastically increases both the ester interchange rate and the polymerization rate, such that the ester interchange time and the polycondensation time are drastically reduced as compared to more conventional systems for producing polyester.

19 Claims, No Drawings

PRODUCING A POLYETHYLENE TEREPHTHALATE BASED POLYMER FROM A LOWER DIALKYL ESTER OF A DICARBOXYLIC ACID AND A GLYCOL

RELATED APPLICATION

The present application is a continuation-in-part of U.S. Ser. No. 07/425,540 filed Oct. 23, 1989, now abandoned, directed to a catalyst system.

BACKGROUND OF THE INVENTION

1) Field of the Invention

The present invention relates to a process for producing a polyethylene terephthalate (PET) based polymer from a lower dialkyl ester of a dicarboxylic acid (LDE) and a glycol (GLY) using a specific catalyst system and the addition of small amounts of dicarboxylic acid (DA). This improves not only the ester interchange time but also the polymerization time In particular, the catalyst system comprises manganese (Mn), lithium (Li), cobalt (Co) (optional) and antimony (Sb). More specifically, manganese and lithium are used as catalysts for the ester interchange while cobalt and antimony are used as catalysts for the polycondensation stage. In addition to the catalyst system, the addition of less than about 6.0 weight percent (based on the amount of LDE used) dicarboxylic acid during late stages of vacuum-let-down or after vacuum-let-down further reduces polymerization time and permits lower molar ratios of LDE and glycol to be used.

2) Prior Art

In prior art processes, dimethyl terephthalate (DMT) and ethylene glycol (EG) are typically reacted in the presence of a catalyst (manganese) at atmospheric pressure and at a temperature of from about 180° C. to 230° C. In the presence of a suitable catalyst, these components undergo ester interchange to yield bis (2-hydroxyethyl) terephthalate or "monomer" and methanol The reaction which is conventionally done with 1 mole of DMT and 2 to 2.4 moles of ethylene glycol is reversible and is carried to completion by removing the methanol formed. During the ester interchange, the monomer is the substantial majority product (not considering the methanol) along with small amounts of low molecular weight polymers and unreacted components.

The monomer is then polymerized by a polycondensation reaction, where the temperature is raised to about 280° C. to 310° C. and the pressure is reduced to below 1 mm of mercury vacuum and in the presence of a suitable polymerization catalyst (antimony). From this reaction, polyethylene terephthalate (PET) and ethylene glycol are formed. Because the reaction is reversible, the glycol is removed as it is evolved, thus forcing the reaction toward the formation of the polyester. This known process is described in U.S. Pat. No. 4,501,878 to Adams.

Manganese is the preferred catalyst for ester interchange reactions, but the amount of manganese employed must be strictly controlled. The presence of too little manganese during the ester interchange reaction results in very long reaction times, while the presence of too much manganese results in unwanted side products during the polycondensation reaction, and unacceptable degradation of the polymer resulting in poor color (thus lowering the quality of the polymer). The exact range of manganese which proves to be the most desirable must generally be determined through trial and error because many factors affect the reactivity of the manganese. For example, reaction temperature, reaction pressure, the degree of mixing during reaction, the purity of the raw materials, the presence of other additives, etc., all affect the effectiveness of manganese.

In prior art processes, manganese was employed to obtain suitable ester interchange reaction times, but the manganese must be sequestered after ester interchange or during polycondensation by a polyvalent phosphorous compound to aid in reducing the discoloration and unwanted side products Generally, prior art processes employed about 50 ppm to 150 ppm manganese based on the expected yield of the polymer, as the ester interchange catalyst. Using more than about 150 ppm manganese resulted in polymer degradation even if phosphorous was employed in excess to sequester the manganese. It is believed that this occurred because the phosphorous was incapable of complexing with the manganese to the degree necessary to prevent discoloration.

U.S. Pat. No. 3,709,859 to Hrach et al discloses a multi-component catalyst system for producing polyester. Among the many catalysts mentioned are lithium, cobalt, manganese and antimony. Although these catalysts are set forth in the background portion of the patent, the patent claims a catalyst system comprising antimony, lead, and calcium, and additionally strontium or barium. Hrach et al also teach the necessity of employing pentavalent phosphorous compounds as stabilizers in order to prevent the formation of discolored polyester.

U.S. Pat. No. 3,657,180 to Cohn discloses a process for making polyester resin in which lithium or a divalent metal compound are employed as catalyst The specification states that manganese may be one of the divalent metallic compounds which can be employed. The order of mixing the various raw materials and the addition of the compounds to the process described in the Cohn invention is stated to be critical The process is carried out by reacting DMT and ethylene glycol in the presence of a lithium salt under ester interchange conditions followed by the addition of manganese The process also includes using manganese as a catalyst with lithium being added after the ester interchange reaction. In either case, the second metal is always added after ester interchange, and thus is not used as a catalyst. Moreover, the second metal is always added in a higher than catalytic amount. The second metal is added along with a slurry of glycol and a small amount of terephthalic acid before vacuum-let-down to provide slip for polyester film and the amount added is several factors larger than catalytic amounts.

British Patent No. 1,417,738 to Barkey et al discloses a process for manufacturing polyester in which a preferred ester interchange catalysts may include zinc, manganese, cobalt, and lithium, among others. Preferred polycondensation catalysts include antimony compounds. This reference, however, claims other catalyst compounds and mentions the above catalyst only as background information.

Various patents assigned to Eastman Kodak Company (British Patent Nos. 1,417,738, and 1,522,656; U.S. Pat. Nos. 3,907,754, 3,962,189, and 4,010,145) disclose a broad variety of catalyst systems, including a manganese, cobalt, lithium and titanium combination and a manganese, titanium, cobalt and antimony catalyst system, with phosphorous being used in each of these systems as a sequestering agent. Each of these catalysts was added at the beginning of ester interchange. Although these catalyst systems would generally reduce the overall time required to process the raw materials into polyester, because the ester interchange time was substantially improved; the polycondensation time was not substantially improved.

U.S. Pat. No. 3,487,049 to Busot discloses a catalyst system of manganese, sodium and antimony Furthermore, a small amount of terephthalic acid mixed in a glycol slurry is added to the reactor during vacuum-let-down (at 30 mm mercury) for increasing the polymerization rate, etc.

Improvements which reduce the ester interchange time, but not the polycondensation time, for example, are not particularly advantageous especially where different reactor vessels are employed for the ester interchange reaction and the polycondensation reaction. When different reactor vessels are employed, a reduction in only the ester interchange time, for example, does not necessarily reduce the total process time, because the total process is only as fast at the slowest stage in the process Therefore, a reduction in time for one of the two stages may not improve the overall existing process. In such a situation, additional reactor vessels could be purchased for the slowest stage to improve the total process time, but this is an expensive solution.

In addition to increasing the ester interchange rate and polycondensation rate, it is desirable to use lower molar ratios of GLY to DMT, i.e., lower than 2:1 as is conventionally known. Although chemically GLY and DMT are present in PET in a 1:1 molar ratio, at least a 100 percent excess of GLY (2:1 ratio) must be employed in the conventional process to yield the required high degree of ester interchange and high molecular weight of the polymer, and to prevent side reactions which lower the yield and produce polymer having poor color and clarity Moreover, lower ratios of GLY to DMT conventional processes drastically increase the process time, when a Mn/Sb catalyst system is used.

There remains a need to develop a catalyst system and process which will reduce not only the ester interchange reaction time but also the polycondensation reaction time so that the totality of processing time is substantially reduced.

It is a further aim or aspect of the present invention to not only quickly produce a PET based polyester from raw materials, but produce a polyester which has acceptable clarity, IV and color properties.

It is an additional aspect of the present invention to reduce the GLY/LDE molar ratio below 2:1 during manufacturing of PET based polymer and yet maintain the yield, color, and clarity of the polymer. Furthermore, the lower molar ratio of GLY/LDE with the catalyst system and dicarboxylic acid addition does not significantly lengthen the polycondensation time.

SUMMARY OF THE INVENTION

The present invention combines catalysts which are effective in the ester interchange reaction and catalysts which are effective in the polycondensation reaction, and uses those catalysts in specific amounts and under a unique manner of introducing such catalysts to the polyethylene terephthalate (PET) based polymer production process so as to yield not only an improvement in the ester interchange time, but also an improvement in the polycondensation time. In particular, the present invention comprises a catalyst system consisting of manganese and lithium to be used for the ester interchange reaction and the catalysts of cobalt (optional) and antimony to be employed in the polycondensation reaction.

Moreover, the present invention also employs a small amount of dicarboxylic acid (DA) during late stages of, or after vacuum-let-down such that lower GLY/LDE ratios can be employed without sacrificing process time, polymer yield, color and clarity.

In the broadest sense, the present invention comprises a method for making a PET based polyester from a lower dialkyl ester of a dicarboxylic acid (LDE) and a suitable glycol comprising the steps of: reacting the glycol with LDE at a molar ratio of between about 1.4/1 to about 2.5/1, at a suitable temperature and pressure and in the presence of an effective amount of manganese and lithium catalysts sufficient to produce monomer and alcohol; removing the resultant alcohol to more completely react the LDE and glycol; reducing the pressure to a vacuum pressure sufficient to initiate polycondensation; polymerizing the resultant monomer at a suitable temperature and pressure and in the presence of an effective amount of an antimony catalyst and optionally, but preferably a cobalt catalyst to form a PET based polyester; and adding dicarboxylic acid during or after the late stages of reducing the pressure to a vacuum, in an amount sufficient to increase the polycondensation rate.

In the broadest sense, the present invention also comprises a PET based product made by the above-mentioned process.

DESCRIPTION OF THE PREFERRED EMBODIMENTS

A polyethylene terephthalate (PET) based polymer of the present invention is prepared from a lower dialkyl ester of a dicarboxylic acid (LDE) and glycol. Suitable LDE's include dimethyl terephthalate, dimethyl isophthalate, diethyl terephthalate, diethyl isophthalate, dipropyl terephthalate, dipropyl isophthalate, dibutyl terephthalate, dibutyl isophthalate, dialkyl naphthalates such as 2,6 dimethyl naphthalate, or mixtures of two or more of these. The glycol (GLY) may comprise ethylene glycol, diethylene glycol, polyethylene glycol, blends of ethylene glycol and propane and/or butane diol, or mixtures of two or more of these. The present invention may be used to produce a PET based polymer by either a continuous process or a batch process, both of which are well known in the art.

The catalyst system of the present invention comprises from about 10 ppm to about 150 ppm manganese (Mn); from about 50 ppm to about 250 ppm lithium (Li); optionally, but preferably from about 10 ppm to about 40 ppm cobalt (Co); and from about 200 ppm to about 400 ppm antimony (Sb), based upon the expected yield of the polyester. This catalyst system, when used in the most effective amounts, increased the ester interchange rate and polymerization rate, thereby reducing both the ester interchange time and the polycondensation time Additionally, adding a small amount of dicarboxylic acid (DA) during the late stages of, or after vacuum-let-down further reduces the polycondensation time, especially when using low mole ratios of glycol to LDE.

Generally, the Mn and Li are added before the beginning of or during the ester interchange reaction. At the end of ester interchange or any time during polycondensation, the manganese is sequestered in those situations where polymer color is important by the addition of a sequestering agent, discussed in more detail later. The Sb and Co can be added before the beginning of or during polymerization as explained more fully later.

When stating that the manganese and lithium can be added at any time before or during ester interchange, it is intended to include the addition of the catalyst metals in the LDE, glycol, or other feedstock material streams. For example, a part, or all the ester interchange catalysts could be added into the glycol feed stream. Moreover, if the feed stream would also include other additives such as colorants, delustrants, opaquing agents, etc., the catalyst for the ester interchange process (manganese and lithium) could be a part of the additive feed stream.

When stating that cobalt and antimony can be added at any time before or during polymerization, it is intended to include the fact that antimony can be added at any time, including with the other metal catalyst of manganese and lithium, in the LDE, glycol, or other feedstock material streams. Cobalt, on the other hand, must be added only after substantial completion of the ester interchange reaction. The addition of cobalt before substantial completion of ester interchange retards the ester interchange reaction rate. Thus, whether antimony is added with other catalysts in the feedstock streams, or is added with the cobalt after the ester interchange reaction does not make any difference in the polymer produced.

Although metals are described for the catalyst system of the present invention, the catalyst may be added in the form of many different compounds. For example, compounds such as oxides and acetates are the most preferred, while such organic and inorganic compounds as carbonates, phosphates (except manganese phosphates), halides, sulfides, amines, compounds of Group VI, etc., may also be employed. Preferably, manganese, lithium, and cobalt are added as catalysts in the form of acetates, while antimony is generally added in the form of antimony oxide All catalyst compounds can also be used in the glycolized form by pre-reacting with glycol. When a catalyst is added in the form of a compound, the amount of compound added is determined by the amount of metal catalyst desired and the amount of metal catalyst available in the compound.

Other additives may be included in the general procedure outlined above, such as coloring agents, delustrants, opaquing agents, stabilizers, etc. These additives do not add or detract from the present invention.

Suitable dicarboxylic acids are:

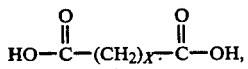

where X>2, such as succinic, glutaric, adipic, pimelic, suberic, azelaic, sebacic, fumaric, and di- or tri- carboxylic acid of benzene or naphthalene, such as phthalic, isophthalic, terephthalic, trimellitic, trimesic, and mixtures of two or more of these. The preferred DA is terephthalic acid because this acid can be employed to produce unmodified PET.

In the process of the present invention, GLY and LDE are reacted either in a batch process or a continuous process at a temperature of between 150° C. to 250° C. at approximately atmospheric pressure in an ester interchange reaction to produce monomer and alcohol. The LDE and GLY are reacted in the presence of manganese and lithium and are generally reacted in a molar ratio of GLY to LDE, for example, of about 1.4/1 to 2.5/1, preferably between 1.6/1 to 1.8/1. Because the ester interchange reaction is reversible, it is necessary to remove the alcohol formed to assure that the reaction favors the formation of monomer -bis (2-hydroxyethyl) terephthalate (when using dimethyl terephthalate and ethylene glycol).

It is theorized that lithium initiates the ester interchange reaction between the LDE and the glycol at a lower temperature than the effective temperature range of manganese. Although Applicants do not wish to be bound by this theory, it is believed that the addition of lithium to manganese in the ester interchange reaction increases the ester interchange rate thereby reducing the ester interchange time.

The reactivity of manganese as a catalyst occurs at a higher temperature than that of lithium. Manganese has a very high reactivity in both the ester interchange reaction and the polycondensation reaction. It is generally preferred to sequester the manganese such that it is ineffective and is inert during the polycondensation reaction, particularly when the polyester is to be employed in applications where color is important, such as textiles. Unsequestered manganese produces a polymer with poor color, the polymer has a broader molecular weight distribution, which is generally undesirable, and when manganese is active as a catalyst in the polycondensation stage, many undesirable by-products such as oxides, carboxyl groups, etc., are created.

The typical sequestering agent is a multivalent phosphorous. Thus, at the end of the ester interchange reaction or during the polycondensation reaction, a tri- or penta-valent phosphorous compound is usually added. Typical phosphorous compounds suitable as sequestering agents for the manganese are tributyl phosphate, polyphosphoric acid, triphenylphosphite, etc. It is believed that the phosphorous forms a complex with the manganese which is very stable and thus causes the manganese to be unavailable for catalytic activity during the polycondensation reaction. On the other hand, it is believed that phosphorous does not form a stable complex with the lithium, cobalt, nor antimony Thus, each of these compounds would be reactive whenever conditions are achieved (such as temperature) that make them a catalyst for the production of PET based polymer.

It is noted that the phosphorous complex does not sequester 100 percent of the manganese. Thus in choosing the manganese level, it must be kept in mind that use of manganese yields bad polymer color, undesirable by-products, and broad molecular weight distribution for the polymer formed With the present invention, it is desirable to provide a balance between the manganese and lithium as the ester interchange catalyst such that the reactivity, reaction speed, and side reactions are controlled in a manner to produce a quality product. Accordingly, it is important that a sufficient amount of manganese be employed that will speed up the ester interchange reaction beyond that which can occur when only lithium is being employed, but, on the other hand, employing a sufficient amount of lithium to achieve good color of polymer, to avoid side reactions, and to achieve a narrower molecular weight distribution of the polymer, which are the benefits of the lithium catalyst Moreover, the lithium catalyst is also active, because it has not been sequestered, during the polycondensation reaction and thus aids in reducing the overall polycondensation time over a catalyst system that uses antimony alone.

After manganese has been sequestered, the polycondensation catalyst may be added. It is important that cobalt not be added during the ester interchange reaction because it has been determined that an ester interchange catalyst system of cobalt, manganese, and lithium actually slows down the ester interchange reaction rate and increases the ester interchange time over that of a manganese and lithium catalyst system and produces a gray polymer which may be unacceptable in those applications where color is important. Since cobalt cannot be added until after substantial completion of the ester interchange reaction, it would be convenient to add the cobalt with the sequestering agent, or more preferably, shortly after the addition of the sequestering agent. Likewise, the antimony may also be added at the time of addition of the sequestering agent or shortly thereafter.

On the other hand, the antimony catalyst may be added with the various raw material feedstock streams in the same manner as the ester interchange catalyst of manganese and lithium. Antimony is not effective during the ester interchange reaction because the temperature of the ester interchange reaction is lower than the reactivity temperature of antimony for producing polyester polymer. Thus, the antimony can be added any time before or during the polycondensation reaction.

At the end of the ester interchange reaction, the monomer is then subjected to a polycondensation reaction to yield a PET based polymer and glycol. The polycondensation reaction occurs at a temperature range of between 250° C. to 310° C. at a vacuum pressure of approximately 0.1 to 3 mm of mercury. The reaction is reversible and, therefore, glycol is continuously removed to force the completion of the reaction toward the production of a PET based polymer. Between the ester interchange reaction and the polycondensation reaction, it is necessary to reduce the pressure from that of the ester interchange reaction to what is required for the polycondensation reaction. This period of time is typically called the vacuum-let-down time. It is preferred to add the polycondensation reaction catalyst of cobalt and antimony before the start of the vacuum-let-down in those situations where opening the reaction vessel would break the vacuum, necessitating restarting the vacuum-let-down.

It is theorized that lithium and antimony increase the polycondensation rate and that the optional addition of between about 20 ppm and 40 ppm of cobalt, based upon the expected yield of the polyester, to the polycondensation reaction, further increases the polycondensation rate over that of lithium and antimony, and thereby reduces the polycondensation time further than that achieved with lithium and antimony.

Generally, using an amount of any one of the catalysts which is outside the ranges of the present invention is not desirable. Using an amount less than about the minimum stated for any of the catalyst generally yields a result which is not as substantial as that obtained with the present invention. Using an amount more than about the maximum stated for any of the catalyst produces undesirable effects such as poor color, unwanted side products, high cost, etc.

To further increase the polycondensation rate, thereby reducing the polycondensation time, a small amount of dicarboxylic acid (DA) is added during or after vacuum-let-down. Generally less than 6.0 percent by weight based upon the amount (weight) of LDE used is sufficient. If too little DA is added (generally less than about (0.5 weight percent), the polycondensation time is not significantly reduced. If too much DA is added (generally more than about 6.0 percent by weight), the reaction speed will be even lower than that without the DA addition.

In addition to the above, it is believed that lithium forms salt complexes with the DA which makes it more soluble and more reactive with glycol to further improve the overall yield of PET.

Lastly, it has been discovered that using the catalyst system of the present invention along with the small addition of DA allows the PET based polymer production process to be conducted using GLY to LDE mole ratios much lower than has been known in the past. In the past, the proper mole ratio of glycol to DMT was in the range of 2.0 to 2.4 (see U.S. Pat. No. 4,501,878 to Adams). With the present invention, the mole ratio of GLY to LDE may range from 1.4/1 to 2.5/1. Preferably, the mole ratio of GLY to LDE is between 1.6/1 to 1.8/1. This preferred range yields the lowest ester interchange and polycondensation times, and yields good quality polymer which is more efficient to produce than prior art processes.

During vacuum-let-down, the pressure is reduced from atmospheric pressure to about 3.0 mm Hg, or less. The DA is added during the late stages of or after completion of vacuum-let-down, i e., when the vacuum is from about 250 mm to about 0.3 mm Hg, and the reaction vessel temperature is from about 250° C. to about 290° C. Adding DA before vacuum-let-down or before the vacuum reaches about 250 mm Hg does not significantly improve the polycondensation time. Just before vacuum-let-down the process has a hydroxyl (glycol) to carboxyl ratio of about 2:1. The polycondensation reaction is most efficient when this ratio reaches about 1:1. As vacuum-let-down starts with a reduction in the pressure and an increase in the temperature, glycol distills off, thus reducing the amount of hydroxyls in the reactor. The addition of DA (carboxyls) between atmospheric pressure (the pressure during ester interchange) and about 250 mm Hg is not particularly beneficial because the amount of DA needed to balance the hydroxyl/carboxyl ratio is quite large, producing problems of solubility and a drop-in reaction temperature, etc. Moreover, if too much DA is added, excessive carboxyls cannot be removed and the polycondensation reaction rate decreases significantly, thus increasing the polycondensation time. Since excessive hydroxyls can be removed by evaporation, it is better to err on the side of excessive hydroxyls rather than excessive carboxyls.

DA is added after vacuum-let-down has reached about 250 mm Hg or less (during or after the completion of vacuum-let-down). DA is added in an amount of from 0.5 to 6.0 percent by weight based on the amount (weight) of LDE employed If DA is added at the end of vacuum-let-down, the preferred range for the DA addition is from 1.0 to 1.5 percent by weight. If DA is added at about 250 mm Hg during vacuum-let-down, the preferred range for DA addition is about 6.0 weight percent.

The DA may be added as a solid or in a slurry with glycol (any glycol previously disclosed is acceptable), where the slurry may range from 80/20 to 30/70 weight percent of DA/glycol. Adding DA to glycol in amounts greater than 80/20 results in the slurry being too thick to pump. Using a slurry less than 30/70 adds too much glycol resulting in a poor hydroxyl/carboxyl balance.

When the molar ratio is less than 1.6/1, it is preferable to employ a more active catalyst (titanium) during ester interchange to insure a high degree of ester interchange. When the molar ratio of GLY/LDE is greater than 1.6/1, it is not beneficial to add titanium because of polymer degradation and discoloration.

Experimental Procedure

Autoclave batches (roughly 1,000 grams of polymer were produced) were prepared in which batches for Example 1 were run at approximately 2.1 to 1 mole ratio of ethylene glycol (EG) to DMT in a batch process, while the batches for Example 2 were run from 2.08 to 1.55 mole ratio of EG/DMT. The autoclave was first charged with DMT, ethylene glycol and the various indicated catalyst. When the following experiments employed manganese, lithium, or cobalt, these metals were added in the form of acetates, and antimony was added in the form of oxide, with the amount of catalysts added being based upon the metals themselves. The autoclave was then heated to approximately 155° C. at atmospheric pressure where initiation of the ester interchange began. During charging of the raw materials, the autoclave was subjected to an inert gas (nitrogen at 4 standard cubic feet per hour) to aid in preventing oxidation. Generally, the autoclave was agitated with a stirrer to assure homogeneous commingling of the raw materials. At the start of the ester interchange reaction (approximately when the reactor contents reached 155° C.), the flow of nitrogen gas was terminated and the starting time was recorded The autoclave temperature during ester interchange rose from approximately 155° C. to about 220° to 230° C. During the ester interchange the methanol was continuously removed to force the reaction toward the production of the monomer. At this point, the ester interchange reaction was substantially complete and polyvalent phosphorous (for example, tributylphosphate) was added to sequester the manganese. During the addition and mixing of the phosphorous compound the nitrogen gas was once again turned on.

After the phosphorous had been thoroughly and uniformly mixed with the monomer, the polycondensation catalysts were added in the amounts indicated. Vacuum-let-down was initiated and during this time the flow of nitrogen gas was once again terminated. During vacuum-let-down a vacuum is drawn on the autoclave until a vacuum of about 1.0 mm of mercury or lower is achieved. At the end of the vacuum-let-down, the autoclave was again heated to about 270° C. thereby initiating the polycondensation reaction In Example 2, DA was added after vacuum-let-down (except for Experiment 1) in an amount from 1.0 to 2.0 weight percent, based on the amount of DA used. The polycondensation reaction proceeded until substantial completion, during which the glycol formed was removed. The polycondensation time was recorded.

Once the polyester was formed, the polymer was tested for intrinsic viscosity (IV), color, melting point, glass transition temperature, number of carboxyl end groups (CEG) expressed in micro equivalents per gram, the mole percent of diethylene glycol (DEG) present, and the presence of various catalytic components. The color test was ASTM Method E308-85 and measured luminescence (L*), yellow-blueness (b*), and red-greenness (a*) of the polymer. The IV was tested at 25° C. using a orthochlorophenol solvent in which 8 grams of the polymer was mixed with 100 ml of the solvent. The melting point and $T_g$ were determined by Differential Scanning Calorimetry.

EXAMPLE 1

Various catalyst systems were employed to demonstrate the present invention. In Experiment 1 (the control), manganese and antimony were employed at about 61 ppm manganese and 490 ppm antimony, based upon the expected yield of the polymer. The manganese was in the form of manganese acetate and the antimony was in the form of antimony oxide. The components were added as described previously under experimental conditions. At the end of ester interchange, 88 ppm of phosphorous was added.

Experiment 2 was similar to Experiment 1 but used a lesser amount of manganese (13 ppm) as the ester interchange catalyst and a slightly lesser amount of antimony (409 ppm) as the polycondensation catalyst. At the end of ester interchange, 88 ppm of phosphorous was added.

The third experiment used manganese and cobalt as the ester interchange catalyst and antimony as the polycondensation catalyst. The amount of manganese was 75 ppm, the amount of cobalt was 20 ppm and the amount of antimony was 328 ppm. The cobalt was added simultaneously with the manganese which were charged into the autoclave with the raw components. At the end of ester interchange, 90 ppm of phosphorous was added.

Experiment 4 employed the same catalyst system as Experiment 3 but the cobalt was added after the ester interchange process such that only the manganese used at 75 ppm was the ester interchange catalyst. Cobalt at 20 ppm and antimony at 328 ppm were employed as polycondensation catalysts. At the end of ester interchange 90 ppm of phosphorous was added to the autoclave.

Experiment 5 employed as the ester interchange catalyst manganese, lithium and cobalt all in the form of acetates, and specifically, 27 ppm of manganese, 144 ppm of lithium and 20 ppm of cobalt were employed In the polycondensation stage, antimony in the amount of 376 ppm was added before the polycondensation stage. At the end of the ester interchange reaction 90 ppm of phosphorous was added.

In Experiment 6 manganese and lithium were added as the catalysts for the ester interchange reaction, while cobalt and antimony were added as the catalysts for the polycondensation stage. Specifically, 27 ppm of manganese and 144 ppm of lithium were added in the form <of acetates, while 20 ppm of cobalt was added after ester interchange in the form of an acetate and 376 ppm of antimony was added in the form of an oxide. At the end of the ester interchange reaction 90 ppm of phosphorous was added.

The reaction times, IVs, melting points, $T_g$'s, colorants, vacuum let down times, CEG, DEG, and amounts of catalysts were measured. The results of the Example are set forth in Table 1.

TABLE 1

|  | Experiment 1 | Experiment 2 | Experiment 3 | Experiment 4 | Experiment 5 | Experiment 6 |
|---|---|---|---|---|---|---|
| Ester Interchange Catalyst | Mn | Mn | Mn/Co | Mn | Mn/Co/Li | Mn/Li |
| Polycondensation Catalyst | Sb | Sb | Sb | Co/Sb | Sb | Co/Sb |
| Ester Interchange Time (min) | 167 | 332 | 120 | 151 | 107 | 90 |
| Polycondensation Time (min) | 111 | 127 | 304 | 170 | 79 | 55 |
| Vacuum Let Down Time (min) | 44 | 58 | 61 | 54 | 56 | 45 |
| Total Ester Interchange and Polycondensation Time (min) | 278 | 459 | 424 | 321 | 186 | 145 |
| IV in deciliters/gm | .628 | .630 | .590 | .583 | .622 | .612 |
| Melt Point °C. | 255 | 252 | 255 | 254 | 254 | 256 |
| Tg °C. | 78.1 | 77.9 | 73.2 | 80.3 | 76.9 | — |
| Color |  |  |  |  |  |  |
| L* | 80.34 | 78.87 | 77.75 | 80.33 | 76.5 | 81.45 |
| a* | −1.72 | −1.86 | −2.27 | −1.51 | −0.46 | −0.71 |
| b* | 7.24 | 10.01 | 5.25 | 3.72 | 7.7 | 1.91 |
| CEG | 12.9 | 14.9 | 25.3 | 20.5 | 27.6 | 14.3 |
| DEG | 1.35 | 1.69 | 1.44 | 1.18 | 0.87 | 0.55 |
| Catalyst added |  |  |  |  |  |  |
| Mn ppm | 61 | 13 | 75 | 75 | 27 | 27 |
| Li ppm | — | — | — | — | 144 | 144 |
| Co ppm | — | — | 20 | 20 | 20 | 20 |
| Sb ppm | 490 | 409 | 328 | 328 | 376 | 376 |
| Phosphorous in Polycondensation | 88 | 88 | 90 | 90 | 90 | 90 |

Experiment 1 is the control and the ester interchange time is approximately 167 minutes, the polymerization time is approximately 111 minutes and the total of those times are 278 minutes when manganese is used as the ester interchange catalyst and antimony is used as the polycondensation catalyst. Experiment 2 demonstrates that reducing the manganese level drastically affects (increases) the ester interchange time.

Experiment 3 demonstrates that employing cobalt as an ester interchange catalyst does indeed affect the ester interchange time by reducing the time approximately 47 minutes. The polycondensation time increased because for this particular example the amount of antimony employed was 328 ppm compared with 490 ppm employed in Experiment 1. This experiment also demonstrates poor color when cobalt is an ester interchange catalyst, and higher CEG.

Experiment 4 used the same amount of cobalt, manganese and antimony as Experiment 3, however, the cobalt was employed as a polycondensation catalyst. While the ester interchange time is slightly less than the control, the polycondensation time is significantly higher than the control, but less than the polycondensation time of Experiment 3, demonstrating that cobalt is an effective polycondensation catalyst. Additionally, Experiment 4 produces a polymer with good color.

In Experiment 5, lithium, manganese, and cobalt were ester interchange catalyst, while only antimony was the polycondensation catalyst. Both the ester interchange time and polycondensation time for Experiment 5 were significantly better than the control. Because cobalt is used as an ester interchange catalyst, the color is poor (brightness) and CEG is high. The addition of lithium results in low DEG's.

Experiment 6 employed as ester interchange catalysts manganese and lithium, while cobalt and antimony were employed as polycondensation catalysts. The amounts of catalyst were the same as employed in Experiment 5. Experiment 6 had excellent color properties, an acceptable CEG level, and excellent low DEG level. Most important, both the ester interchange time and the polycondensation time were drastically reduced. In comparing Experiment 6 with Experiment 5, it is obvious that the addition of cobalt as an ester interchange catalyst hinders the catalytic activity of manganese and lithium. Likewise, the improved polycondensation time obtained in Experiment 6 is a result of cobalt as a polycondensation catalyst.

EXAMPLE 2

The Experimental Procedure previously described was followed for this example, except that a small amount of terephthalic acid (TA) was introduced, either in solid form or in a glycol slurry (60 weight percent TA, 40 weight percent EG) after vacuum-let-down. For comparative purposes, the amount of terephthalic acid was varied, as well as the point of addition of the acid in the process (after ester interchange or during vacuum-let-down). Additionally, the mole ratio of EG/DMT was varied between 1.55 and 2.08. In some experiments when mole ratios below about 1.8 were employed, the ester interchange temperature was increased to 235° C. to enhance the chemical reactions (Experiments 5, 7-9 and 11). Otherwise, the ester interchange temperature was 225° C. and the polycondensation temperature was 285° C. Also, with lower mole ratios below about 1.6 (Experiments 12 and 13) a hotter, more active catalyst was added (titanium). However, titanium is known to degrade and discolor the polymer. These effects can be mitigated by controlling the amount of titanium added.

Experiments 1-4 and 6 employed the same catalyst system, while experiments 5, 7 and 11 doubled the amount of manganese. Experiment 8 demonstrates the effect of using no cobalt catalyst as compared with Experiment 7. Experiment 9 demonstrates the effect of using half the amount of lithium as compared with Experiment 7. Experiments 12 and 13 demonstrate a lower mole ratio of EG to DMT and the effect of adding titanium. Experiment 10 demonstrates the effect of employing a Mn/Na ester interchange catalyst system.

TABLE 2

|  | 1 | 2 | 3 | 4 | 5 | 6 | 7 | 8 | 9 | 10 | 11 | 12 | 13 |
|---|---|---|---|---|---|---|---|---|---|---|---|---|---|
| Ester Interchange | Mn/Li | Mn/Li | Mn/Li | Mn/Li | Mn/Li | Mn/Li | Mn/Li | Mn/Li | Mn/Li | Mn/Na | Mn/Li | Mn/Li/Ti | Mn/Li/Ti |

TABLE 2-continued

| | 1 | 2 | 3 | 4 | 5 | 6 | 7 | 8 | 9 | 10 | 11 | 12 | 13 |
|---|---|---|---|---|---|---|---|---|---|---|---|---|---|
| Catalyst Polycondensation | Sb/Co | Sb/Co | Sb/Co | Sb/Co | Sb/Co | Sb/Co | Sb/Co | Sb Alone | Sb/Co | Sb/Co | Sb/Co | Sb/Co | Sb/Co |
| Catalyst Ester Interchange Time (min) | 102 | 93 | 101 | 94 | 104 | 94 | 107 | 104 | 150 | 149 | 95 | 95 | 92 |
| Polycondensation Time (min) | 156 | 68 | 75 | 203 | 52 | 62 | 51 | 67 | 48 | 122 | 67 | 46 | 83 |
| Total Ester Interchange and Polycondensation Time (min) | 258 | 161 | 176 | 297 | 156 | 158 | 158 | 171 | 198 | 271 | 162 | 141 | 175 |
| Mole Ratio EG/DMT | 2.05 | 2.08 | 2.06 | 2.05 | 1.8 | 1.77 | 1.7 | 1.7 | 1.7 | 1.7 | 1.6 | 1.55 | 1.55 |
| Percent Terephthalic Acid | 2.0 Solid After EI | 1.0 Solid After VLD | 1.5 Solid After VLD | 2.0 Solid After VLD | 1.5 Slurry After VLD | 1.5 Solid After VLD | 1.5 Slurry After VLD | 1.5 Slurry After VLD | 1.5 Slurry After VLD | 1.5 Slurry After VLD | 1.5 Slurry After VLD | 1.5 Solid After VLD | 1.5 Solid After VLD |
| IV in deciliters/gm | .593 | .591 | .568 | .581 | .617 | .619 | .593 | .625 | .651 | .622 | .614 | .588 | .589 |
| Color | | | | | | | | | | | | | |
| L* | 79.81 | 82.61 | 83.82 | 81.64 | | 84.95 | 83.55 | 81.73 | | 81.29 | | 80.25 | 83.36 |
| a* | −2.13 | −1.13 | −1.30 | −2.22 | | −1.19 | −1.76 | −1.58 | | −1.74 | | −2.47 | −2.03 |
| b* | 5.82 | 4.87 | 1.52 | 4.71 | | 2.83 | 3.65 | 8.52 | | 8.09 | | 5.59 | 5.59 |
| Catalyst added | | | | | | | | | | | | | |
| Mn ppm | 13 | 13 | 13 | 13 | 27 | 13 | 27 | 27 | 27 | 28 | 27 | 13 | 13 |
| Li ppm | 142 | 142 | 142 | 142 | 142 | 142 | 142 | 142 | 72 | — | 142 | 142 | 142 |
| Co ppm | 20 | 20 | 20 | 20 | 20 | 20 | 20 | None | 20 | 23 | 20 | 20 | 20 |
| Sb ppm | 367 | 367 | 367 | 367 | 367 | 367 | 367 | 367 | 367 | 351 | 367 | 367 | 367 |
| Ti ppm | — | — | — | — | — | — | — | — | — | 337 Na | — | 18 | 12 |
| Phosphorous in Polycondensation ppm | 88 | 88 | 88 | 88 | 88 | 88 | 88 | 88 | 88 | 56 | 88 | 88 | 88 |

The results of Example 2 are set forth in Table 2.

Results

Shorter EI and PC times were obtained when using Mn/Li/Sb/Co catalyst system and the addition of a small amount of DA (terephthalic acid (TA)) after vacuum let down. The addition of TA after ester interchange when the molar ratio is about 2.0/1 slows the reaction speed down (Experiment 1). Employing a small amount of DA even when conventional mole ratios of EG/DMT are used increases the polycondensation rate and thus reduces the polycondensation time. Surprisingly, PC times decrease even more drastically when a low mole ratio of EG/DMT was used (Experiments 5, 9 and 11). Raising the ester interchange temperature to 235° C. (from 225° C.) appears helpful particularly when the mole ratio of EG/DMT is less than 1.6. The addition of a titanium catalyst when the mole ratio of EG/DMT is less than 1.6 is helpful (Experiments 11 and 12). The ester interchange catalyst system of Mn/Na is much less effective than a Mn/Li catalyst system.

Experiment 5 was repeated except that 1.5 weight percent adipic acid was added in place of the TA. The ester interchange time was 96 minutes and the polycondensation time was 57 minutes, for a total time of 153 minutes. This compares favorably with the total time of 156 minutes in original Experiment 5, and demonstrates that a broad range of dicarboxylic acids may be used.

Experiment 5 was again repeated, except that 6 weight percent TA was added at 250 mm Hg (during vacuum-let-down) and 60 ppm of Mn was employed (as compared to 27 ppm Mn originally). The ester interchange time was 82 minutes and the polycondensation time was 85 minutes, for a total time of 167 minutes. This experiment demonstrates that DA can be added as early as 250 mm Hg if up to 6 weight percent DA is employed.

Thus, it is apparent that there has been provided, in accordance with the invention, a catalyst system and a method of preparing polyester from a lower dialkyl ester of a dicarboxylic acid and glycol using the catalyst system that fully satisfies the objects, aims and advantages as set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations that fall within the sphere and scope of the invention.

That which is claimed is:

1. A process for producing a polythylene terephthalate based polyester polymer from a lower dialkyl ester of a dicarboxylic acid and glycol comprising the steps of:

(a) reacting a lower dialkyl ester of a dicarboxylic acid with glycol by an ester interchange reaction at a mole ratio of between about 1.4/1 to about 2.5/1 at a suitable temperature and pressure, and in the presence of an effective amount of manganese and lithium catalyst sufficient to increase the ester interchange rate, avoid side reactions, and avoid color degradation, to yield alcohol and monomer;

(b) removing said alcohol during said ester interchange to increase the yield of said monomer;

(c) reducing the pressure to a vacuum pressure sufficient to initiate polycondensation; and (d) polymerizing said monomer by a polycondensation reaction at a suitable temperature and pressure, and in the presence of an effective amount of an antimony catalyst, and adding during late states of or after said reducing the pressure step, and effective amount of dicarboxylic acid sufficient to increase the rate of polycondensation to produce polyester.

2. The process of claim 1, wherein cobalt is also present in an effective amount during said polycondensation reaction.

3. The process of claim 2, wherein said manganese, lithium and cobalt are in the form of acetates and said antimony is in the form of oxide.

4. The process of claim 2, wherein said manganese is present in a range of from about 10 ppm to about 150 ppm, said cobalt is present in a range of from about 10 ppm to about 40 ppm, said lithium is present in a range of from about 50 ppm to about 250 ppm, and said antimony is present in a range of from about 200 ppm to about 400 ppm, wherein all amounts are based upon the expected yield of said polyethylene terephthalate based polyester polymer.

5. The process of claim 4, wherein said manganese is sequestered after said ester interchange reaction is substantially complete or during said polycondensation reaction by adding an effective amount of sequestering agent.

6. The process of claim 5, wherein said sequestering agent is a multivalent phosphorous compound.

7. The process of claim 1, wherein said ester interchange reaction occurs at a temperature range of from about 150° C. to about 250° C. and at about atmospheric pressure.

8. The process of claim 1, wherein said pressure reduction step reduces the pressure to less than about 3 mm Hg, and said temperature of said polycondensation reaction is increased to a range of from about 255° C. to about 310° C.

9. The process of claim 8, wherein said effective amount of dicarboxylic acid is added no earlier than during said pressure reduction step after said vacuum pressure is about 250 mm Hg or less.

10. The process of claim 9, wherein said effective amount of dicarboxylic acid is less than 6.0 weight percent, based upon the expected yield of said polyethylene terephthalate based polyester.

11. The process of claim 10, wherein said dicarboxylic acid is selected from the group comprising: the formula

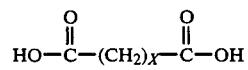

where x>2 and includes succinic, glutaric, adipic, pimelic, suberic, azelaic, sebacic, and fumaric; and dicarboxylic acids of benzene and naphthalene such as phthalic, isophthalic, and terephthalic; and tricarboxylic acids of benzene and naphthalene such as trimellitic, and trimesic; and mixtures of two or more of these.

12. The process of claim 9, wherein said dicarboxylic acid is added in solid form.

13. The process of claim 9, wherein said dicarboxylic acid is added in slurry form with glycol.

14. The process of claim 1, wherein said mole ratio of glycol to lower dialkyl ester is from about 1.6/1 to about 1.8/1.

15. The process of claim 1, wherein said mole ratio of glycol to lower dialkyl ester is less than about 1.6/1.

16. The process of claim 15, wherein said ester interchange and polymerization steps occur in the presence of an effective amount of titanium catalyst.

17. The process of claim 1, wherein said lower dialkyl ester is selected from the class comprising: dimethyl terephthalate, dimethyl isophthalate, diethyl terephthalate, diethyl isophthalate, dipropyl terephthalate, dipropyl isophthalate, dibutyl terephthalate, dibutyl isophthalate, dimethyl naphthalate, and mixtures of two or more of these.

18. The process of claim 1, wherein said glycol is selected from the class consisting of ethylene glycol, diethylene glycol, polyethylene glycol, blends of ethylene glycol and propane diol, blends of ethylene glycol and butane diol, and mixtures of two or more of these.

19. A polyethylene terephthalate polymer made by the process of claim 1.

* * * * *